(12) United States Patent
Dedecker et al.

(10) Patent No.: US 8,754,169 B2
(45) Date of Patent: Jun. 17, 2014

(54) METHOD OF PREPARING RUBBER COMPRISING POLYMERIC COMPOSITIONS AND ISOPRENE COMPRISING INTERPOLYMERS

(75) Inventors: Mark N. Dedecker, North Canton, OH (US); James E. Hall, Mogadore, OH (US); Daniel F. Graves, N.W. Canal Fulton, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/616,809

(22) Filed: Sep. 14, 2012

(65) Prior Publication Data
US 2013/0041105 A1    Feb. 14, 2013

Related U.S. Application Data

(63) Continuation of application No. 12/521,616, filed as application No. PCT/US2007/026221 on Dec. 21, 2007, now abandoned.

(60) Provisional application No. 60/877,835, filed on Dec. 29, 2006.

(51) Int. Cl.
C08F 287/00  (2006.01)
C08L 55/02   (2006.01)
C08L 9/06    (2006.01)

(52) U.S. Cl.
USPC .................................................... 525/98

(58) Field of Classification Search
USPC ............................. 525/88, 100, 98
See application file for complete search history.

(56) References Cited

U.S. PATENT DOCUMENTS

| | | | |
|---|---|---|---|
| 2,646,418 A | 7/1953 | Lang | |
| 3,937,760 A | 2/1976 | Cole et al. | |
| 4,026,969 A * | 5/1977 | Mostert et al. | 525/192 |
| 4,311,819 A | 1/1982 | Tung et al. | |
| 4,409,369 A | 10/1983 | Lyons et al. | |
| 4,503,188 A | 3/1985 | Mancinelli | |
| 5,034,449 A | 7/1991 | Mallikarjun | |
| 5,635,565 A | 6/1997 | Miyajima et al. | |
| 5,721,320 A | 2/1998 | Priddy et al. | |
| 6,027,800 A | 2/2000 | Shen | |
| 2001/0011116 A1 | 8/2001 | Kurata et al. | |
| 2004/0220345 A1 | 11/2004 | DeDecker et al. | |
| 2006/0122331 A1 | 6/2006 | Vanspeybroeck et al. | |
| 2007/0225440 A1 | 9/2007 | Sosa et al. | |
| 2010/0113699 A1 * | 5/2010 | Dedecker et al. | 525/98 |

FOREIGN PATENT DOCUMENTS

| | | |
|---|---|---|
| EP | 0629658 | 12/1994 |
| EP | 0732345 | 9/1996 |

OTHER PUBLICATIONS

International Preliminary Report on Patentability, International Appl. No. PCT/US2007/026221, dated Jul. 7, 2009 (9 pages).
International Search Report, International Appl. No. PCT/US2007/026221, dated Nov. 13, 2008 (5 pages).

* cited by examiner

*Primary Examiner* — Jeffrey Mullis
(74) *Attorney, Agent, or Firm* — Meredith E. Hooker; Arthur M. Reginelli

(57) ABSTRACT

A method for forming a rubber-modified polymeric composition includes polymerizing vinyl aromatic monomer within a mixture including the vinyl aromatic monomer and an interpolymer having at least one block of polyisoprene, at lest one block of polystyrene, and at lest one block of polybutadiene to thereby form the rubber-modified polymeric composition, where the interpolymer includes an internal block of polyisoprene.

15 Claims, No Drawings

METHOD OF PREPARING RUBBER COMPRISING POLYMERIC COMPOSITIONS AND ISOPRENE COMPRISING INTERPOLYMERS

This application is a continuation application of U.S. Non-Provisional application Ser. No. 12/521,616, filed on Jan. 11, 2010, which claims the benefit of International Application Serial No. PCT/US2007/026221, filed on Dec. 21, 2007, and U.S. Provisional Patent Application Ser. No. 60/877,835, filed Dec. 29, 2006, the entire content of which is incorporated by reference herein.

FIELD OF THE INVENTION

One or more embodiments of the present invention provides a method for forming a rubber-comprising polymeric composition by polymerizing vinyl aromatic monomer in the presence of an interpolymer comprising one or more mer units deriving from isoprene and the resultant compositions. The disclosure relates also to certain isoprene comprising interpolymers.

BACKGROUND OF THE INVENTION

Rubber modified polymers have been produced from vinyl aromatic monomers by a number of processes for the purpose of improving impact resistance. Typically, a rubber is mixed with a polymerized vinyl aromatic monomer, or alternatively, the vinyl aromatic monomer is polymerized in the presence of a rubber. In the latter method, the vinyl aromatic monomer is partially graft polymerized onto the rubber. Rubber modified copolymers of vinyl aromatic monomers have also been produced, such as acrylonitrile-butadiene-styrene (ABS). ABS copolymers have been produced using polymerization processes such as bulk-suspension, continuous bulk, and emulsion.

SUMMARY OF THE INVENTION

One or more embodiments of the present invention provide a method for forming a rubber-comprising polymeric composition, the method comprising polymerizing vinyl aromatic monomer, within a mixture that comprises the vinyl aromatic monomer and an interpolymer comprimising one or more mer units deriving from isoprene.

One or more embodiments of the present invention also provide a thermoplastic composition comprising a thermoplastic polymer phase comprising one or more polymers having mer units deriving from the polymerization of vinyl aromatic monomer; and an interpolymer, where the interpolymer comprises one or more mer units deriving from the polymerization of isoprene.

One or more embodiments of the present invention provides a composition comprising a polystyrene or interpolymer comprising mer units deriving from the polymerization of styrene; and an interpolymer comprising one or more mer units deriving from the polymerization of isoprene.

One or more embodiments of the present invention provides an acrylonitrile-butadiene-styrene composition comprising an interpolymer comprising mer units deriving from the polymerization of styrene and acrylonitrile; and an interpolymer comprising units deriving from the polymerization of butadiene and isoprene.

In another embodiment of the invention there are provided interpolymers comprising blocks of butadiene and blocks of isoprene wherein the blocks of isoprene are located in at least one of the termini positions of the interpolymers.

DETAILED DESCRIPTION OF ILLUSTRATIVE EMBODIMENTS

I. Introduction

According to one or more embodiments of the present invention, rubber-comprising polymeric compositions are prepared by polymerizing vinyl aromatic monomer, optionally in the presence of at least one other monomer in the presence of an interpolymer comprising one or more mer units deriving from isoprene (isoprene interpolymers). In one or more embodiments, the vinyl aromatic monomer, and the optional other monomer and the interpolymer are introduced to form a mixture, and the monomer is polymerized within the mixture. The monomer that is polymerized comprises vinyl aromatic monomer, and therefore methods of the present invention are useful for preparing rubber-comprising polymeric compositions such as high-impact polystyrene (HIPS), transparent-impact polystyrene (TIPS), and acrylonitrile-butadiene-styrene (ABS).

II. Vinyl Aromatic Monomer

Any vinyl aromatic monomer may be used in the process herein. For example, suitable vinyl aromatic monomers include those vinyl aromatic compounds where the phenyl substituent is either substituted or unsubstituted. Substituted phenyl substituents include those substituents where one or more of the hydrogen atoms of the phenyl ring are replaced with an organic group. The organic group may include hydrocarbyl groups, and in certain embodiments the hydrocarbyl groups include alkyl groups, such as those that may include from 1 to about 3 carbon atoms.

In one or more embodiments, vinyl aromatic monomer may include those compounds defined by the formula

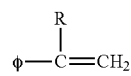

wherein R is hydrogen or methyl, 4) is an aromatic ring structure having from 1 to 3 aromatic rings with or without alkyl, halo, or haloalkyl substitution, wherein any alkyl group contains 1 to 6 carbon atoms and haloalkyl refers to a halo substituted alkyl group. In certain embodiments, φ is a phenyl or alkyl phenyl group.

Exemplary vinyl aromatic monomers include styrene, alpha-methylstyrene, all isomers of vinyl toluene including paravinyltoluene, all isomers of ethyl styrene, propyl styrene, vinyl biphenyl, vinyl naphthalene, vinyl anthracene and the like, and mixtures thereof.

The at least one other monomer that is polymerized within the mixture with the isoprene interpolymer may also include monomer interpolymerizable with vinyl aromatic monomer. These monomers may include acrylic monomers such as acrylonitrile, methacrylonitrile, methacrylic acid, methyl methacrylate, acrylic acid, and methyl acrylate; maleimide, phenylmaleimide, and maleic anhydride.

III. Interpolymer Including Isoprene Units

A. Interpolymer Description

The interpolymers that comprise one or more mer units deriving from isoprene may be referred to herein as isoprene interpolymers, isoprene interpolymer rubber, isoprene interpolymer modifier, or simply rubber modifier. In one or more embodiments, these interpolymers comprise at least 2 weight %, in other embodiments at least 3 weight %, and in other embodiments at least 5 weight % mer units deriving from the polymerization of isoprene. In these or other embodiments, the interpolymer comprises less than 30 weight %, in other embodiments less than 25 weight %, in other embodiments less than 20 weight %, in other embodiments less than 15 weight %, and in other embodiments less than 10 weight % mer units deriving from the polymerization of isoprene. A generally suitable isoprene interpolymer comprises an amount of at least 2 weight % to less than 30 weight % mer units deriving from the polymerization of isoprene.

In one or more embodiments, a portion of the mer units deriving from isoprene are located in polyisoprene blocks. In one or more embodiments, at least 80%, in other embodiments at least 85%, in other embodiments at least 90%, in other embodiments at least 95%, and in other embodiments at least 99% of the mer units deriving from the polymerization of isoprene are located in one or more polyisoprene blocks. In one or more embodiments, essentially all of the isoprene mer units are located within one or more polyisoprene blocks. In these or other embodiments, a small or residual amount of isoprene mer units are positioned in tapers between the polyisoprene block and the adjacent block or segment. In other embodiments, the copolymer is essentially devoid or materially devoid of a tapered section.

In one or more embodiments, from about 2 to about 30% by weight, in other embodiments from about 3 to about 25% by weight, and in other embodiments from about 5 to about 15% by weight of the interpolymer includes one or more polyisoprene blocks. In one or more embodiments, the polyisoprene block or blocks include at least 5, in other embodiments at least 10, in other embodiments at least 50, and in other embodiments at least 100 repeating mer units that derive from isoprene.

The other mer units of the isoprene interpolymer may derive from any monomer interpolymerizable with the isoprene, or any monomer that can block polymerize or couple to homopolymer or copolymer containing mer units deriving from the polymerization of isoprene. Exemplary interpolymerizable monomer includes conjugated diene monomer, such as butadiene, or vinyl aromatic monomer, such as styrene.

In certain embodiments, the isoprene interpolymer comprises a multi-block interpolymer. In one or more embodiments, the multi-block interpolymer comprises at least one polyisoprene block, at least one polybutadiene block, and at least one polystyrene block. Examples of multi-block interpolymers include poly(polyisoprene-b-polystyrene-b-polybutadiene), poly(polyisoprene-b-polybutadiene-b-polystyrene), and poly(polyisoprene-b-polystyrene-b-polybutadiene-b-polyisoprene). In these or other embodiments, these block interpolymers may include, for example, an isoprene-butadiene-styrene block interpolymer, an isoprene-styrene-butadiene block interpolymer, or an isoprene-butadiene-styrene-isoprene block interpolymer.

In certain embodiments, the polyisoprene block may be positioned at one or more termini of the interpolymer. In other embodiments, the block may be positioned internally within a block interpolymer or internally within a coupled interpolymer.

In one or more embodiments, the isoprene interpolymers of the present invention may include coupled polymers such as coupled block interpolymers. For example, the interpolymers may be linearly coupled or radially (or star) coupled. For example, an isoprene-butadiene block interpolymer can be linearly coupled with another isoprene-butadiene block interpolymer to form an isoprene-butadiene-butadiene-isoprene coupled block interpolymer. In the case of a radially coupled block interpolymer similar to the foregoing example, the coupled block interpolymer can include three or more arms that each comprises an isoprene block and butadiene block. In one or more embodiments, the location of coupling may form linearly coupled or radially coupled polymers where the isoprene block remains at the termini of the coupled polymer. In other embodiments, the locations of the coupling may form linearly or radially coupled polymers where the isoprene block is located adjacent to the location of coupling, and thereby form a coupled copolymer with an internal polyisoprene block.

In one or more embodiments, the base interpolymers, which include the interpolymers prior to any coupling, may have a number average molecular weight ($M_n$) of from about 30 to about 200 kg/mole, in other embodiments from about 70 to about 150 kg/mole, and in other embodiments from about 90 to about 120 kg/mole. In these or other embodiments, the base interpolymers may have a weight average molecular weight ($M_w$) of from about 60 to about 320 kg/mole, in other embodiments from about 80 to about 250 kg/mole, and in other embodiments from about 100 to about 175 kg/mole. The molecular weight of the interpolymers may be determined by gel permeation chromatography (GPC) using polystyrene standards and Mark Houwink constants to correct for chain length properties of polybutadiene and polyisoprene content. Inasmuch as the isoprene interpolymers of the present invention can include coupled polymers, the molecular weight and/or Mooney viscosity (ML 1+4 @ 100° C.) can be tailored. As those skilled in the art appreciate, di-coupling of the interpolymers will increase molecular weight of the interpolymers generally by a factor of about two. Likewise, tri-coupling will generally increase the molecular weight by a factor or about three, and tetra-coupling will generally increase the molecular weight by a factor of about four.

B. Interpolymer Synthesis

The isoprenyl-containing interpolymers employed in the present invention may be prepared by employing anionic polymerization techniques. Where the isoprenyl-containing interpolymers include block interpolymers, the anionic polymerization technique may include sequential addition of monomer to achieve the desired blocks. Anionic polymerization techniques include the formation of living polymers formed by reacting anionic initiators with certain unsaturated monomers to propagate a polymeric structure. Throughout formation and propagation of the polymer, the polymeric structure may be anionic and/or living. The new batch of monomer subsequently added to the reaction can add to the living end of the existing chain and increase the degree of polymerization. A living polymer, therefore includes a polymeric segment having a living or reactive end. Anionic polymerization is further described in George Odian, *Principles of Polymerization*, ch. 5 (3$^{rd}$ Ed. 1991), or Panek, 94 J. Am. Chem. Soc., 8768 (1972), which are incorporated herein by reference.

Monomers that can be employed in preparing an anionically polymerized living polymer include any monomer capable of being polymerized according to anionic polymerization techniques. These monomers include those that lead to the formation of elastomeric homopolymers or interpolymers. Suitable monomers include, without limitation, conjugated $C_4$-$C_{12}$ dienes, $C_8$-$C_{18}$ monovinyl aromatic monomers, and $C_6$-$C_{20}$ trienes. Examples of conjugated diene monomers include, without limitation, 1,3-butadiene, isoprene, 1,3-pentadiene, 2,3-dimethyl-1,3-butadiene, and 1,3-hexadiene. A non-limiting example of trienes includes myrcene. Aromatic vinyl monomers include, without limitation, styrene, α-methyl styrene, p-methylstyrene, and vinylnaphthalene. When preparing elastomeric interpolymers, such as those containing conjugated diene monomers and aromatic vinyl monomers, the conjugated diene monomers and aromatic vinyl monomers are normally used at a ratio of 95:5 to 50:50, and preferably 95:5 to 65:35.

Any anionic initiator can be employed to initiate the formation and propagation of the living polymers. Exemplary anionic initiators include, but are not limited to, alkyl lithium initiators such as n-butyl lithium, arenyllithium initiators, arenylsodium initiators, and alkyl magnesium compounds.

The amount of initiator employed in conducting anionic polymerizations can vary widely based upon the desired polymer characteristics. In one or more embodiments, from about 0.1 to about 100, and in other embodiments from about 0.33 to about 20 mmol of lithium per 100 g of monomer is employed.

Anionic polymerizations may be conducted as a solution polymerization in a polar solvent such as tetrahydrofuran (THF) or a non-polar hydrocarbon such as the various cyclic and acyclic hexanes, heptanes, octanes, pentanes, their alkylated derivatives, and mixtures thereof, as well as benzene.

In carrying out the anionic polymerization herein, the monomers, except for the isoprene, and the solvent(s) that are used, are purified, prior to use, to reduce or remove any water or other polar contaminants that may be present in the monomers and solvents that could terminate the initiators.

In order to promote randomization in interpolymerization and/or to control vinyl content, a polar coordinator may be added to the polymerization ingredients. When employed, they may be used in amounts from 0.01 to about 90, or 0.1 to about 40 equivalents per equivalent of lithium. The amount depends on the amount of vinyl desired, the level of styrene employed, and/or the temperature of the polymerization, as well as the nature of the specific polar coordinator (modifier) employed. Suitable polymerization modifiers include, for example, ethers or amines.

Compounds useful as polar coordinators include those having an oxygen or nitrogen heteroatom and a non-bonded pair of electrons. Examples include dialkyl ethers of mono and oligo alkylene glycols; "crown" ethers; tertiary amines such as tetramethylethylene diamine (TMEDA); linear THF oligomers; and the like. Specific examples of compounds useful as polar coordinators include tetrahydrofuran (THF), linear and cyclic oligomeric oxolanyl alkanes such as 2,2-bis (2'-tetrahydrofuryl) propane, dipiperidyl ethane, dipiperidyl methane, hexamethylphosphoramide, N—N'-dimethylpiperazine, diazabicyclooctane, dimethyl ether, diethyl ether, tributylamine and the like. The linear and cyclic oligomeric oxolanyl alkane modifiers are described in U.S. Pat. No. 4,429,091, which is incorporated herein by reference.

Anionically polymerized living polymers can be prepared by either batch or continuous methods. A batch polymerization may be started by charging a blend of monomer(s) and solvent to a suitable reaction vessel, followed by the addition of the polar coordinator (if employed) and an initiator compound. The reactants may be heated to a temperature of from about 20 to about 130° C. and the polymerization is allowed to proceed for from about 0.1 to about 24 hours. This reaction produces a reactive polymer having a reactive or living end.

In one or more embodiments, the living polymer may be quenched, coupled, or terminated. This may include deactivation of the living polymer or residual initiator compounds. Quenching can be accomplished by contacting the living polymer with a proton or proton source. Proton sources may include water, alcohol (e.g., isopropyl alcohol), and organic acids. In lieu of or in addition to quenching the living polymer, terminating or coupling agents may be reacted with the living polymer. Examples of coupling agents include tin tetrachloride, tetraethyl orthosilicate, tetraethoxy tin, and silicon tetrachloride. Types of terminating agents include functionalizing agents.

IV. Production of Isoprene Comprising Polymeric Compositions

In one or more embodiments, an isoprene comprising polymeric composition may be produced in situ by polymerizing styrene monomer (optionally together with at least one other monomer) in the presence of an isoprene comprising interpolymer.

In one or more embodiments, the rubber comprising polymeric composition can be prepared by dissolving the isoprene comprising interpolymer in a vinyl aromatic monomer and polymerizing the rubber/monomer mixture. This process can be conducted using conventional techniques known in the art for preparing rubber reinforced polymers such as HIPS and ABS, which are described in U.S. Pat. Nos. 2,646,418, 4,311, 819 and 4,409,369 and are incorporated herein by reference.

The amount of isoprene comprising interpolymer employed in practicing the present invention can be described with reference to the weight percent mer units deriving from dienes based upon the total weight (i.e. combined weight) of the interpolymer and the monomer to be polymerized. In one or more embodiments, the amount of diene (weight of diene mer units in the rubber modifier) combined with the monomer to be polymerized may include from about 3 to about 20 weight percent, in other embodiments from about 5 to about 15 weight percent, and in other embodiments from about 7 to about 12 weight percent mer units deriving from dienes based on the total weight of the monomer to be polymerized (e.g. and styrene and optional comonomer) and the isoprene interpolymer.

Initiators may also optionally be used in the process. Useful initiators include free radical initiators such as peroxide and azo compounds, which are believed to accelerate the polymerization of the vinyl aromatic monomer. Exemplary initiators include, but are not limited to, tertiary butyl peroxyacetate, dibenzoyl peroxide, dilauroyl peroxide, t-butylhydroperoxide, ditertiary-butylperoxide, cumene hydroperoxide, dicumylperoxide, 1,1-bis(tertiary-butylperoxy)-3,3,5-trimethyl-cyclohexane, t-butylperoxybenzoate, 1,1-bis(t-butylperoxy)-cyclohexane, benzoylperoxide, succinoylperoxide and t-butylperoxypivilate, and azo compounds such as azobisisobutyro-nitrile, azobis-2,4-dimethylvaleronitrile, azobiscyclohexanecarbo-nitrile, azobismethyl isolactate and azobiscyanovalerate. Typical amounts are well known in the art and may be used in the process of the present invention.

Initiators may optionally be employed in a range of concentrations dependent on a variety of factors including the specific initiators employed, the desired levels of polymer grafting, and the conditions at which the mass polymerization is conducted. In one or more embodiments, from 50 to 2000, and in other embodiments from 100 to 1500, parts by weight of the initiator are employed per million parts by weight of monomer.

Additionally, a solvent may be used in the process. Exemplary solvents include normally liquid organic materials that may form a solution with the isoprenyl-containing copolymer, vinyl aromatic monomer, and the polymer prepared therefrom. Representative solvents include aromatic and substituted aromatic hydrocarbons such as benzene, ethylbenzene, toluene, xylene or the like; substituted or unsubstituted, straight or branched chain saturated aliphatics of 5 or more carbon atoms, such as heptane, hexane, octane or the like; alicyclic or substituted alicyclic hydrocarbons having 5 or 6 carbon atoms, such as cyclohexane; and the like. In general, the solvent can be employed in amounts sufficient to improve the processability and heat transfer during polymerization. These amounts may vary depending on the interpolymer, monomer, and solvent employed, the process equipment and the desired degree of polymerization. If employed, the solvent can be employed in an amount of up to about 35 weight percent, in other embodiments from about 2 to about 25 weight percent, based on the total weight of the solution.

Other materials may also optionally be present during synthesis of the rubber comprising composition. These other materials may include plasticizers, e.g., mineral oil; flow promoters, lubricants, antioxidants, e.g., alkylated phenols such as di-tertbutyl-p-cresol or phosphites such as trisnonyl phenyl phosphite; catalysts, e.g., acidic compounds such as camphorsulfonic acid or 2-sulfoethylmethacrylate; mold release agents, e.g., zinc stearate, or polymerization aids, e.g., chain transfer agents such as an alkyl mercaptan, e.g., n-dodecyl mercaptan. If employed, the chain transfer agent may be employed in an amount of from about 0.001 to about 0.5 weight percent based on the total weight of the polymerization mixture to which it is added.

V. Rubber Comprising Polymer Composition Characteristics

The process of the present invention may provide rubber-comprising thermoplastic resin compositions that comprise a thermoplastic continuous phase and particles of polydiene (e.g. isoprene interpolymer). The thermoplastic continuous phase or matrix may be characterized by including one or more polymers having mer units deriving from the polymerization of vinyl aromatic monomer and optionally mer units deriving from the polymerization of monomer interpolymerizable with vinyl aromatic monomer. The thermoplastic phase may be characterized by a glass transition temperature of at least 100 C, in other embodiments at least 120 C, and in other embodiments at least 130 C. The thermoplastic phase may also be characterized by one or more melting points. In one or more embodiments, the isoprene interpolymer is expected to be grafted to the thermoplastic phase through a mer unit deriving from isoprene or through the residue of the scission of two adjacent mer units deriving from isoprene.

In one or more embodiments, particularly where the isoprene interpolymer includes blocks deriving from isoprene at both termini of the polymer (e.g. isoprene-styrene-butadiene-isoprene block interpolymer), the advantageous modified styrene-acrylonitrile (i.e. ABS) compositions can be prepared inasmuch as these particular isoprene block interpolymers are particularly advantageous for forming relatively small particles within the thermoplastic matrix, thereby yielding rubber comprising polymeric compositions with advantageous gloss.

In one or more embodiments, the process of the present invention is particularly useful in preparing high impact polystyrene (HIPS) and acrylonitrile-butadiene-styrene polymers (ABS) and the isoprene interpolymer.

In one or more embodiments, the use of coupled isoprene interpolymers including polyisoprene block adjacent to the location of coupling are advantageous in providing improved gloss.

The rubber comprising polymeric compositions of the present invention are expected to be useful in a variety of applications including injection molding and thermoforming of refrigerator liners, household appliances, toys, and furniture.

In another embodiment, the present invention relates to certain novel interpolymers comprising blocks of butadiene and blocks of isoprene, wherein the isoprene blocks are located in at least one of the termini positions of the interpolymer. These isoprene-comprising interpolymers comprise isoprene, generally, in an amount of at least 2 to less than 30 weight percent isoprene based on the interpolymer. These novel interpolymers may be produced as described herein, using anionic polymerization technique with sequential addition of the monomers to achieve the desired blocks. As a monomer interpolymerizable with the isoprene monomer, there may be used a conjugated diene, such as butadiene. The novel isoprene comprising interpolymers herein are exemplified in Table I and identified as examples A through J.

In order to demonstrate the practice of the present invention, the following examples have been prepared and tested. The examples should not, however, be viewed as limiting the scope of the invention. The claims will serve to define the invention.

EXAMPLES

The following test procedures were used in evaluating the analytical and performance characteristics herein:

Molecular Weight—The number average molecular weight ($M_n$) and the weight average molecular weight ($M_w$) of the polymers are determined by gel permeation chromatography (GPC) using polystyrene standards and Mark Houwink constants to correct for chain length properties of polybutadiene and polyisoprene content.

In determining the molecular weight values for ($M_n$) and ($M_w$) a dilute solution of polymer in tetrahydrofuran (about 0.1 weight %) is injected into a liquid chromatograph with size exclusion columns (LC/SEC) that is calibrated against known polystyrene standards, then corrected with Mark Houwink constants found in the literature, according to polymer structure, that is, isoprene, butadiene, styrene, vinyl content. The LC/SEC utilized herein is a Waters Alliance 2695 Separations Module using a Waters 410 Differential Refractometer detector. The LC columns used are produced by Polymer Laboratories, Amherst, Mass., and are identified as follows:

1110-1120 PLgel 10u GUARD COLUMN
    1110-6130 PLgel 10E3 A GPC COLUMN
    1110-6140 PLgel 10E4 A GPC COLUMN
    1110-6150 PLgel 10E5 A GPC COLUMN
    1110-6160 PLgel 10E6 A GPC COLUMN Melt Index—melt index is determined following ASTM D1238, condition g, which is a temperature of 200° C., and a 5 kg weight. The melt index is reported in units of g/10 minutes.

Percent Polydiene—% polydiene is the total butadiene plus isoprene in the rubber comprising vinyl aromatic thermoplastic polymer.

Izod—Izod impact was determined according to ASTM D-256. The units are ft-lbs per inch.

Mooney—Mooney viscosity was determined according to ASTM D-1646 (ML 1+4 @ 100° C.).

Solution viscosity was determined according to ASTM D-446 using 5.43% solution in toluene at 25° C. The units are centipoise.

60° Gloss—60° gloss was determined according to ASTM D-2457 at a 60° angle.

Several rubber comprising polymeric compositions were prepared by polymerizing styrene monomer in the presence of various isoprene block interpolymers. The various isoprene block interpolymers are set forth in Table I together with their characteristics.

The isoprene block interpolymer content is provided in parts by weight (pbw), which refers to the parts by weight of monomer fed to the polymerization reactor during synthesis of the interpolymer. In describing the interpolymers, I is isoprene, B is butadiene, and S is styrene.

Example A was produced as follows:
 a. 12.4 lbs of hexanes was added to a 12 gallon reactor;
 b. 272 g isoprene at 100% was added to the reactor; and the temperature was adjusted to 108° F.;
 c. 84 g 3% butyl lithium in hexanes was added to the reactor;
 d. the jacket temperature was increased to 160° F. and maintained until the temperature peaked (about 110 minutes);
 e. added 28.2 lbs of 22% butadiene in hexanes and maintain until a second peak is reached (about 50 minutes);
 f. added 3.6 lbs of 33% styrene in hexanes and maintain until a third peak is reached (about 6 minutes);
 g. waited a further 10 minutes;
 h. added 2-ethylhexanoic acid (5 g) to terminate the living polymer; and
 i. transferred a portion of the mixture to a container, added stabilizing antioxidant(s), and dried the mixture.

Examples B and G

Example B was prepared as follows. To a 120 gallon (450 liter) jacketed reactor was added 149 lbs (67.7 kg) hexanes. The reactor was vented to less than 10 psig, and 1.59 kg isoprene was added to the reactor. The temperature of the mixture was adjusted to 120° F. Then 644 grams of 3% n-butyl lithium in hexanes was added followed by 12.7 grams of oligomeric oxolanyl propanes. The resulting batch is allowed to polymerize for 25 minutes. Then 254 lbs (115.7 kg) of 22% solution of 1,3-butadiene in hexanes is metered in over a 25 minute period. Polymerization continues for 53 minutes during which the temperature in the reactor peaks at 181° F. Then 34 lbs of 31% styrene in hexanes is added to form the third block over a period of 10 minutes. Then 955 grams of isoprene was added to form the fourth block. After waiting 20 minutes for completion of the reaction, 2-ethylhexanoic acid was added to terminate the live ends.

Example G was prepared in accordance with the process for producing Example B except for the contents of isoprene and butadiene, and the initial hexanes charge.

Examples C and J

Examples C and J were prepared in accordance with the process for producing Example B, except for the structure of the interpolymer, the amount of butyl lithium used, no presence of the oligomeric oxolanyl propanes, and the use of butyl benzoate coupler.

In further respect to Example C, the process for preparation differs from the process for preparing Example B in that 290 lbs of 22% 1,3-butadiene was charged to produce the first block, with the initial temperature at 100° F. 580 grams 3% butyl lithium was added. No oligomeric oxolanyl propanes were added. The next block was formed with 36 lbs 31% styrene in hexanes, and the third block was formed by addition of 1.02 kg isoprene. After polymerization was essentially complete, 5.1 gms of butyl benzoate was added to di-couple about 30% of the polymer chains through the living isoprenyl end.

In further respect to Example J, the process differs from the process for producing Example B, in that butyl benzoate was added at the completion of the polymerization to result in dicoupling of about 20% of the chains through the live isoprenyl block.

Examples D and E

Examples D and E were prepared in accordance with the process for producing Example B, except for the following. The structure of the interpolymers of D and E differ from Example B. Furthermore, the process for producing Examples D and E do not utilize oligomeric oxolanyl propanes.

Furthermore, Example D was prepared using 149 lbs hexanes with 1.59 kg isoprene and 643 g 3% butyl lithium to form the first block. The second block was formed with 80 pbw 1,3-butadiene in hexanes (254 lbs) and the third block consisting of 15 pbw styrene in hexanes.

Example F

Example F was prepared in accordance with the process for producing Example B, except for the amounts of the monomers in the interpolymer, and no oligomeric oxolanyl propanes were used in producing Example F.

Example H

Example H was prepared in accordance with the process for producing Example B, except for the structure of the interpolymer and the amounts of the monomers.

Example I

Example I was prepared in accordance with the process for producing Example B, except for the structure of the interpolymers of Example B and I differing, and the amounts of the monomers differing. Also, in producing Example I, oligomeric oxolanyl propanes were not utilized.

TABLE I

| Interpolymer | A | B | C | D | E | F | G | H | I | J |
|---|---|---|---|---|---|---|---|---|---|---|
| Total Monomer Weight, lbs | 8.0 | 72 | 77 | 70 | 70 | 70 | 72 | 70 | 77 | 77 |
| Block Structure | I-B-S | I-B-S-I | B-S-I | I-B-S | I-B-S | I-B-S-I | I-B-S-I | I-B-S | B-S-I | B-S-I |
| Isoprene Content (pbw) | 7.5 | 5 | — | 5 | 10 | 7.5 | 7.5 | 7.5 | — | — |
| Butadiene Content (pbw) | 77.5 | 80 | 85 | 80 | 75 | 75 | 77.5 | 77.5 | 85 | 85 |
| Styrene Content (pbw) | 15 | 15 | 15 | 15 | 15 | 15 | 15 | 15 | 15 | 15 |
| Isoprene Content (pbw) | — | 3 | 3 | — | — | 3 | 3 | — | 3 | 3 |
| Coupled | No | No | Yes | No | No | No | No | No | No | Yes |
| Percent Coupled | — | — | 30% | — | — | — | — | — | — | 20% |
| $M_w$ (kg/mole) | 128.1 | 117.7 | 178.0 | 120.1 | 121.5 | 123.9 | 116.1 | 115 | 109.8 | 133.6 |
| $M_n$ (kg/mole) | 122.6 | 114.1 | 148.6 | 114.6 | 115.4 | 117.7 | 112.5 | 111.2 | 105.6 | 116.6 |
| Mooney Viscosity | 113 | 130 | 138.6 | 25.8 | 118 | 122 | 132 | 135 | 112 | 102 |
| Solution Viscosity, cPs | 27.1 | 22.6 | 55.2 | 55.7 | 24 | 25.7 | 22.1 | 22.6 | 21.9 | 28.5 |
| Butyl Lithium pbw | 0.064 | 0.064 | 0.053 | 0.064 | 0.064 | 0.064 | 0.064 | 0.064 | 0.064 | 0.064 |
| Oligomeric Oxolanyl Propanes pbw | 0 | 0.006 | 0 | 0 | 0 | 0 | 0.006 | 0.006 | 0 | 0 |
| Butyl Benzoate pbw | 0 | 0 | 0.015 | 0 | 0 | 0 | 0 | 0 | 0 | 0.018 |
| 2- ethyl hexanoic acid pbw | 0.137 | 0.138 | 0.092 | 0.138 | 0.138 | 0.138 | 0.138 | 0.138 | 0.138 | 0.110 |

TABLE I-continued

| Interpolymer | A | B | C | D | E | F | G | H | I | J |
|---|---|---|---|---|---|---|---|---|---|---|
| Initial Hexanes Charge, lbs | 12.4 | 149 | 143 | 149 | 165 | 165 | 157 | 157 | 143 | 143 |
| Initial Temperatures, °F. | 108 | 120 | 100 | 130 | 140 | 140 | 120 | 120 | 100 | 100 |

As mentioned above, the isoprene block interpolymers were prepared by anionically polymerizing sequential additions of the various monomers. The polymerizations were conducted in hexanes using an n-butyllithium initiator. The polymerizations were quenched with 2-ethyl hexanoic acid, and certain interpolymers were coupled as noted in Table I. The coupling agent was butyl benzoate. Interpolymers B, G, and H were polymerized and initiated in the presence of a cyclic oligomeric oxolanyl alkane.

Isoprene interpolymers A through J described in Table I were then utilized in preparing isoprene interpolymer comprising vinyl aromatic thermoplastic compositions as follows:

HIPS batches are prepared by first dissolving about 48 grams of isoprene polymer from Table I that is added to 752 grams styrene to make a solution of 800 grams total weight. This solution is then added to a 1.5 liter jacketed glass reactor containing a helical agitator with a hollow shaft having two holes at the bottom for solution to enter, and two holes at the top for solution to exit allowing mixing of the styrene rubber solution. About 141 grams of ethylbenzene is added with 20 grams mineral oil, 0.64 grams Ciba's IRGANOX 1076 antioxidant in a 10% solution in hexanes and 0.15 milliliters of tert-Butyl peroxybenzoate. The mixture is then heated to 100° C. to initiate polymerization of the styrene monomer. The mixture is further heated to between 130-160° C. over a period of 6 hours. During this time, phase inversion occurs where the polystyrene becomes the continuous phase with insoluble isoprene polymer rubber particles present. The mixture is then transferred from the reactor to a vacuum oven at 240° C. to remove volatile components such as residual styrene and ethylbenzene, and results in crosslinking of the conjugated diene phase. The dried polystyrene containing isoprene copolymer rubber particles is then tested with appropriate test methods.

For Examples 4, 5, and 6, three levels of interpolymer A were used, 10%, 8%, and 6%, respectively for Examples 4, 5, and 6.

The data concerning the isoprene interpolymer comprising thermoplastic compositions are reported in Table II.

TABLE II

| | Sample No. | | | | | |
|---|---|---|---|---|---|---|
| | 1 | 2 | 3 | 4 | 5 | 6 |
| Isoprene Interpolymer | H | I | J | A | A | A |
| Melt Index g/10 min | 3.8 | 3.2 | 4 | 1.7 | 1.7 | 5.8 |
| % polydiene | 7.5 | 8.1 | 9.0 | 14.0 | 11.6 | 9.0 |
| Izod ft- lbs/in | 0.77 | 1.11 | 2.58 | 4.76 | 3.95 | 1.74 |
| 60° Gloss | 30.7 | 32.9 | 50.6 | 17.3 | 32 | 52.5 |

| | Sample No. | | | | | | |
|---|---|---|---|---|---|---|---|
| | 7 | 8 | 9 | 10 | 11 | 12 | 13 |
| Isoprene Interpolymer | B | E | C | F | D | G | S730 |
| Melt Index g/10 min | 2.5 | 2.3 | 2.7 | 3.2 | 2.9 | 3.3 | 4.8 |
| % polydiene | 7.4 | 8.4 | 7.8 | 7.5 | 7.5 | 7.4 | 10.3 |
| Izod ft-lbs/in | 0.93 | 1.62 | 2.48 | 0.95 | 0.96 | 0.72 | 0.68 |
| 60° Gloss | 45.6 | 29.8 | 38.3 | 51 | 38.6 | 38.8 | 27.7 |

From the data shown in Table II, it is observed that the balance between Izod impact and 60° gloss for the compositions of the present invention are improved relative to the control of Example 13, where the interpolymer used was Firestone Polymer's Stereon 730, a copolymer of 30% styrene and 70% butadiene. (Stereon is a registered trademark of Firestone Polymers, Akron, Ohio). More particularly, the thermoplastic compositions of the present invention exhibit an increased level of 60° gloss for a given Izod value.

Various modifications and alterations that do not depart from the scope and spirit of this invention will become apparent to those skilled in the art. This invention is not to be duly limited to the illustrative embodiments set forth herein.

What is claimed is:

1. A method for forming a rubber-modified polymeric composition, comprising:
polymerizing vinyl aromatic monomer within a mixture comprising the vinyl aromatic monomer and an interpolymer comprising at least one block of polyisoprene, at least one block of polystyrene, and at least one block of polybutadiene to thereby form the rubber-modified polymeric composition, where the interpolymer comprises an internal block of polyisoprene and terminal polyisoprene blocks, and wherein the interpolymer is prepared by coupling living polymer having terminal isoprene blocks to thereby form an interpolymer with internal isoprene blocks.

2. The method of claim 1, where the interpolymer comprises a triblock interpolymer comprising a polyisoprene block, a polystyrene block, and a polybutadiene block.

3. The method of claim 1, where the interpolymer comprises two polyisoprene blocks located internally within the interpolymer and separated by a coupling moiety.

4. The method of claim 1, where the total isoprene content of the interpolymer ranges from about 3 to about 20 weight percent, based upon the total weight of the isoprene interpolymer and monomer.

5. The method of claim 4, where the total isoprene content of the interpolymer ranges from about 5 to about 15 weight percent.

6. The method of claim 5, where the vinyl aromatic monomer comprises styrene.

7. The method of claim 1, further comprising at least one other monomer copolymerizable with the vinyl aromatic monomer.

8. The method of claim 7, where the at least one other monomer copolymerizable with the vinyl aromatic monomer comprises acrylonitrile.

9. The method of claim 1, where said step of polymerizing comprises a free-radical polymerization method.

10. The method of claim 1, where the isoprene interpolymer comprises at least 2 weight percent mer units deriving from the polymerization of isoprene.

11. The method of claim 1, where the interpolymer includes less than 30 weight percent mer units deriving from the polymerization of isoprene.

12. The method of claim 1, where the interpolymer is selected from the group consisting of coupled poly(polystyrene-b-polybutadiene-b-polyisoprene), coupled poly(polybutadiene-b-polystyrene-b-polyisoprene), and a mixture thereof.

13. The method of claim 1, where the mixture is formed prior to polymerization of the mixture.

14. The method of claim 1, where the rubber-modified polymeric composition is characterized by an Izod impact according to ASTMD-256 of at least 2.48 ft-lbs per inch and a 60 degree gloss according to ASTMD-2457 at a 60 degree angle of at least 38.3.

15. The method of claim 14, where the rubber-modified polymeric composition includes the interpolymer in an amount that is greater than 0.0 weight percent and less than 9.0 weight percent.

* * * * *